United States Patent
Scianna

[19]

[11] Patent Number: 5,997,995
[45] Date of Patent: Dec. 7, 1999

[54] NON-SLIP MAT OR PAD

[75] Inventor: Carl Scianna, Des Plaines, Ill.

[73] Assignee: Microthin Products, Inc., Addison, Ill.

[21] Appl. No.: 09/318,411

[22] Filed: May 25, 1999

Related U.S. Application Data

[62] Division of application No. 08/888,230, Jul. 3, 1997, Pat. No. 5,942,311.

[51] Int. Cl.$^6$ .................................................. B32B 9/00
[52] U.S. Cl. ........................... 428/195; 428/48; 428/204; 428/205; 428/213; 428/319.3; 428/323; 428/411.1; 428/424.6; 427/202; 248/188.2; 248/346.1; 106/36
[58] Field of Search ............................. 428/195, 48, 204, 428/205, 213, 319.3, 323, 411.1, 424.6; 248/346.1, 188.2; 427/202; 106/36

[56] References Cited

U.S. PATENT DOCUMENTS

| | | | |
|---|---|---|---|
| D. 339,799 | 9/1993 | Allen | D14/114 |
| D. 359,036 | 6/1995 | Mandel | D14/114 |
| D. 364,397 | 11/1995 | Bedol | D14/114 |
| D. 365,342 | 12/1995 | Evenson et al. | D14/114 |
| 4,603,494 | 8/1986 | Lehrman | 38/140 |
| 4,834,502 | 5/1989 | Bristol et al. | 350/322 |
| 5,340,075 | 8/1994 | Schriner | 248/346 |
| 5,433,979 | 7/1995 | Williams | 427/496 |
| 5,696,536 | 12/1997 | Murphy | 345/163 |

*Primary Examiner*—Deborah Jones
*Assistant Examiner*—Abraham Bahta
*Attorney, Agent, or Firm*—James A. Geppert

[57] ABSTRACT

A non-slip mat, pad or coaster which is considerably thinner than present known and available pads, the mat or pad being formed from a thin plastic sheet having a lower surface with a tacky characteristic to provide a non-slip coefficient of friction; the mat or pad being formed from a suitable plastic material, such as polyvinyl, polyproplylene, polycarbonate, polystyrene or polyester, etc., and the lower surface is formed by coating the surface with a suitable ink, such as an ultraviolet ink, water-based ink or solvent-based ink containing a tackiness agent in the form of an acrylated polymer. The ink may be applied as a very thin firm of the ink adhesively joined to the underside of the plastic, or the ink is coated onto the undersurface of the pad or mat by silk screening, or in a multimaterial coating operation.

9 Claims, 2 Drawing Sheets

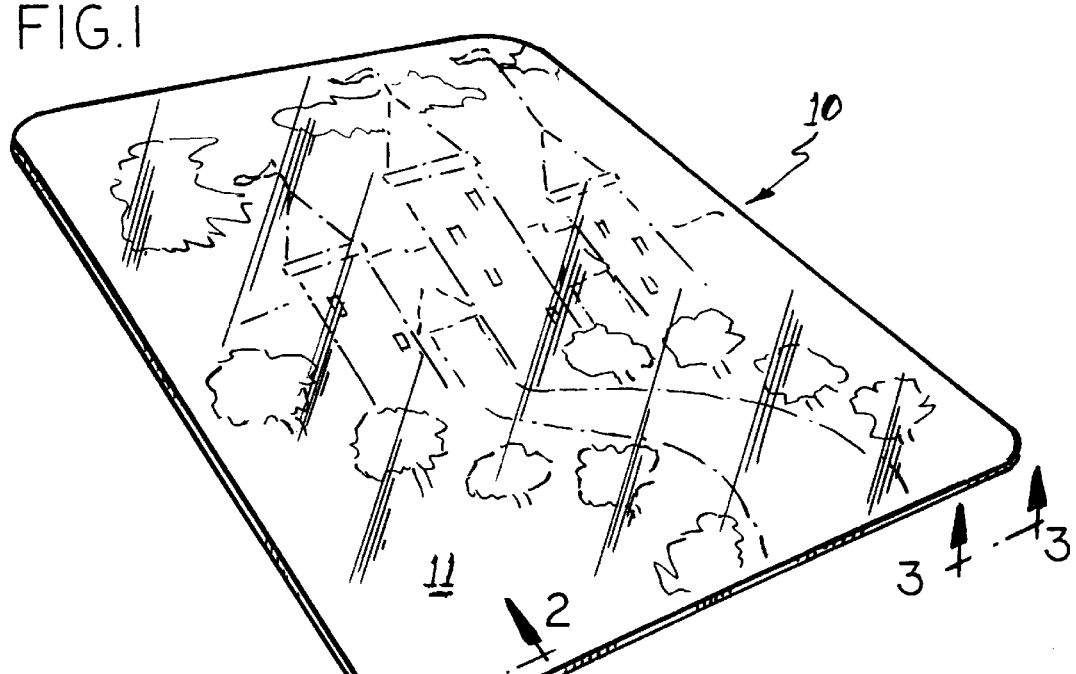
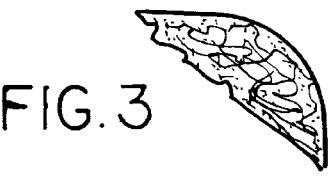
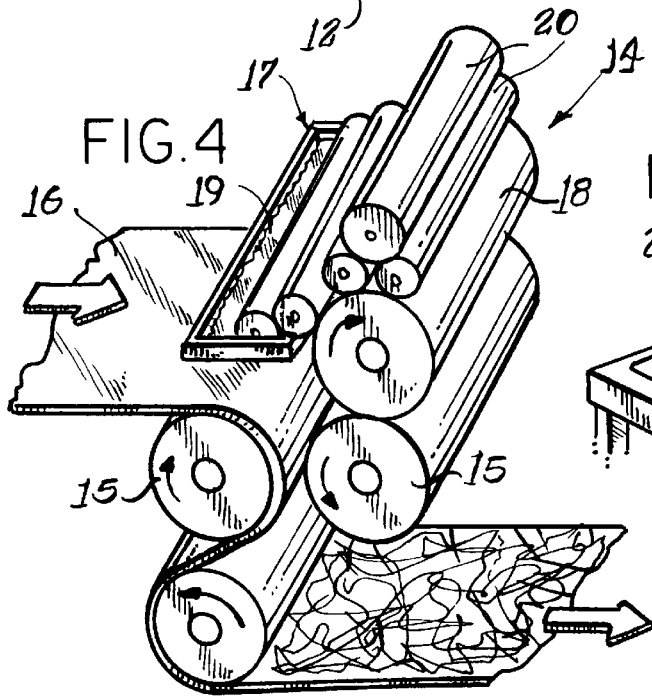
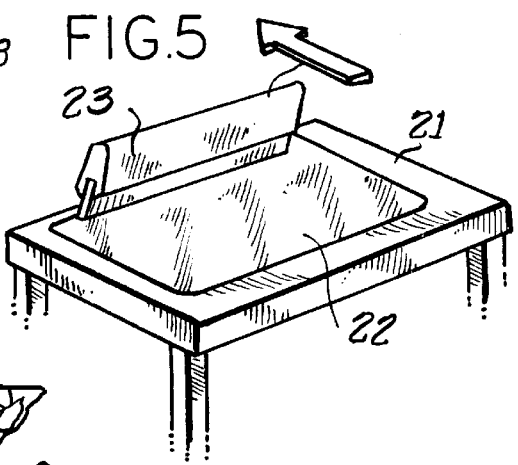

NON-SLIP MAT OR PAD

This is a division of application Ser. No. 08/888,230 filed Jul. 3, 1997, now U.S. Pat. No. 5,942,311.

TECHNICAL FIELD

The invention disclosed herein relates to an improved non-slip mat or pad which is substantially thinner and more compact than presently available mats but provides the required frictional characteristics to prevent slipping upon substantially any surface without being sticky to the touch.

BACKGROUND

With the advent of the computer mouse, the roller on the bottom of the mouse required a pad or mat with a relatively smooth surface upon which the mouse would roll, but the pad would necessarily require a non-slip surface on its lower surface which contacts the desk or shelf surface for the computer or its accessories. A computer mouse is a hand-held device operated on a flat surface which, in cooperation with the appropriate computer hardware and software, permits a computer operator to control the movement of a cursor or pointer located on a computer display such as a CRT monitor. Typically, a computer mouse includes a generally rounded body to be grasped by the operator with a control cable connected to the computer. The lower surface of the mouse includes a roller ball which is connected electronically via the control cable to a cursor or display pointer located on a video display associated with the computer. A typical computer mouse further includes activation buttons. A computer mouse may be used with a graphical use interface (GUI), such as Microsoft Windows 95.

If the operator of the mouse desires to move the display pointer or cursor to the upper left of the display, the operator orients the mouse on the flat operating surface and pushes the mouse in the direction of the upper left corner of the display while watching the display. The cursor changes its position to correspond to the relative change in the position of the mouse; thus, the operator can guide the cursor to any position on the display by use of the mouse.

The use of a mouse greatly increases the speed and ease of inputting commands to the computer and facilitates much faster data entry than that provided by keyboard usage. While computer mice are capable of achieving high resolutions, the work surface upon which the mouse can move can have a profound impact on the resolution and the efficiency of the mouse.

Recently, there has been increased interest in the construction and use of a mouse pad for a computer mouse, or a mat used for a counter, such as for making change in a fast food establishment or in a convenience store. Conventional mouse pads typically consist of a completely flat pad constructed from soft foam materials which may fray and splinter with extended use and with a generally smooth top surface on which the mouse operates. Another problem is that where the mat or pad is contaminated by spillage of liquids or semisolid materials, the foam rubber backing for the smooth top surface may absorb the liquid or other contaminant resulting in degradation of the foam or adherence of the foam material with the top surface of the counter. If not removed promptly, the foam material may stick to the supporting surface, resulting in a later problem of removal.

It would be desirable to provide a mouse pad or non-slip mat for a counter top which is constructed from a very thin material having a lower non-slip surface that is easily manufactured and will not break down or denigrate with extended use, but the material provides a non-slip surface whether the supporting surface is wet or dry.

SUMMARY OF THE INVENTION

The present invention relates to a novel and improved non-slip mat or pad that is much thinner and more efficient than commercially available mouse pads or mats having a foam supporting surface which is in contact with the surface of a counter or desktop of the user. Such a mat or pad would include mouse pads, desk mats, change pads, placemats and coasters. The mat or pad is formed using a substrate formed of a suitable plastic material, such as polyvinyl, polypropylene, polycarbonate, polystyrene or a polyester material with a non-slip lower surface applied either as a film laminated to the substrate or as a coating from an appropriate composition of ink. The ink is applied to the lower surface of the pad or mat and allowed to cure; the ink being provided with an additive to provide a tacky condition to the surface.

The present invention also comprehends a mouse pad or mat which has a non-slip lower surface provided by a suitable process, such as screening the ink onto the surface, lithographic or flexographic printing the ink onto the pad or mat or coated in a sheet feed press or a web feed press.

BRIEF DESCRIPTION OF THE DRAWINGS

FIG. 1 is a perspective view of a mouse pad or other mat or coaster of the present invention.

FIG. 2 is a partial cross sectional view of the pad or mat taken on the irregular line 2—2 of FIG. 1.

FIG. 3 is a partial lower elevational view of a corner of the lower surface of the pad or mat taken on the line 3—3 of FIG. 1.

FIG. 4 is a partial perspective view of a portion of a web feeding press for manufacturing the pad or mat.

FIG. 5 is an illustrative view of a silk screening operation for the coating of the non-slip surface of the pad or mat.

ILLUSTRATIVE EMBODIMENTS OF THE INVENTION

Figure 6:
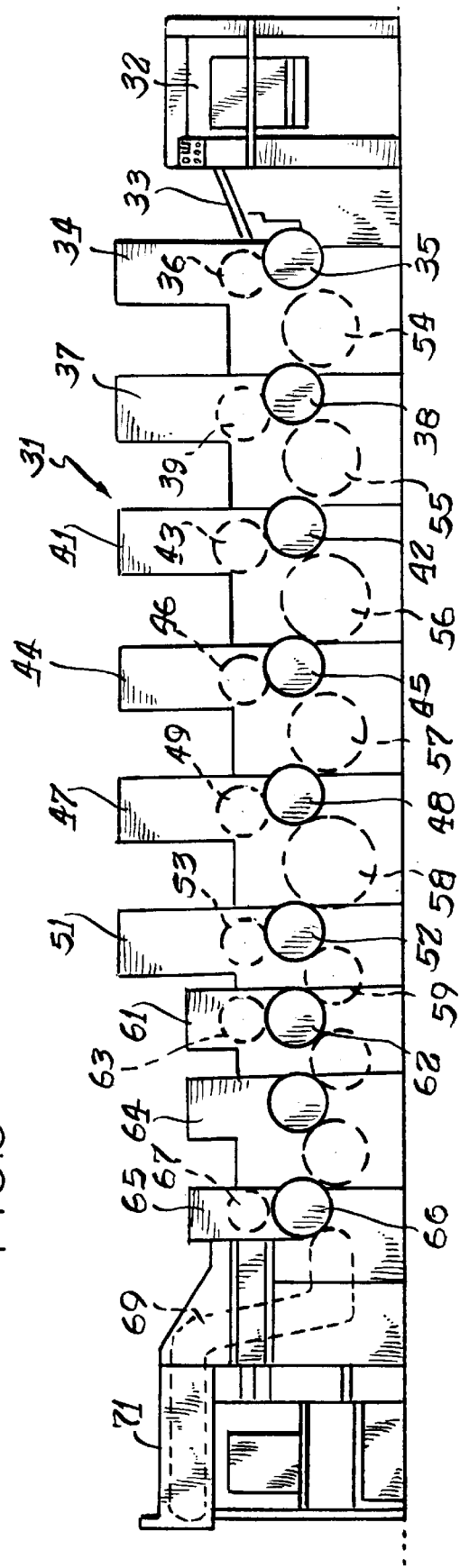
FIG. 6 is an illustrative side elevational view of a multi-color sheet feeding press for multi-color printing on the exposed surface of the pad or mat and coating a non-slip material on the lower surface of the pad or mat.

Referring more particularly to the disclosure in the drawings wherein are shown illustrative embodiments of the present invention, FIG. 1 discloses a mouse pad, deskmat, change pad, placemat, coaster or other mat 10 which is substantially thinner than presently known and used pads as surfaces for operation of a computer mouse, as a mat utilized on a counter of a convenience food or drug store or restaurant or a coaster utilized in a home or restaurant wherein a surface is required to support glasses of liquid where condensation or spillage might occur. The overall thickness of the pad or mat lies within the range of 1.0 mil to 30.0 mils; with a preferred thickness of 10.0 to 30.0 mil for the substrate or plastic carrier 11. The pad 10 is formed of a substantially rigid thermoplastic material, such as polyvinyl, polypropylene, polycarbonate ("LEXAN"), polystyrene or polyesters. To this substrate is added either by application as a thin film or a coating 12, is a suitable ink containing an agent providing a tacky texture providing the non-slip characteristics of the pad or mat. The inks which may be used as a coating or film are ultraviolet (U.V.) inks, which are cured by exposure to ultraviolet light, water-based inks or solvent-based inks which are cured by drying. A dielectric material is usually added to the ink to prevent static, especially where the pad is utilized as a mouse pad, and the ink formulation may contain a scent to offset the odor of the ink.

To provide an appropriate coefficient of friction for a non-slip surface which is to come in contact with a desk, table or counter top, the ink formulation is provided with a tackifier or tackiness agent to provide the non-slip characteristic, but which is not sticky to the touch. Such a tackiness agent may be an acrylated polymer, such as the product "Lustercure" LC 30-100 manufactured by the Kolorcure Corporation of Batavia, Ill. This material is a viscous liquid with a characteristic acrylic odor and is practically insoluble in water.

Application of the non-slip surface material to the underside of the pad or mat is accomplished by one of several methods. The ink may be contained in the form of a thin plastic film or in sheet or strip form and the substrate and film are of discrete dimensions; the substrate 11 and the thin plastic film 13 being adhesively joined and pressed together in a conventional press or passed through a series of opposed pairs of rollers 15, such as shown in FIG. 4, in a web-feed lithographic press 14 wherein pressure by the rollers causes the substrate and film to adhere together. Also, if the thin film 13 and substrate 11 are in long extended sheets or elongated rolls or strips, the substrate strip 16 and the film strip 13 may be run through the series of rollers as shown in FIG. 4.

Also shown in FIG. 4, is a coating attachment 17 for the web-feed lithographic press 14 to apply an ink coating 12 via the rollers 18 to the elongated strip of the substrate material 16. The coating attachment includes a tray 19 for the ink with a series of rollers 20 leading to the rollers 18 which are in contact with the rollers 15 to apply the coating to the strip of the substrate 16.

Another method of forming the non-slip surface for the mat or pad is to apply the liquid ink compounded with the acrylated polymer to provide the non-slip characteristics for the mat or pad by a silk screening process as shown in FIG. 5. This figure discloses a screening process wherein a frame 21 for holding the screen 22 so as to cover the surface of a mat or pad with the U.V. ink being applied onto the surface of the mat or pad through the screen by a squeegee 23. Obviously, if a design is desired in the non-slip surface, the mat or pad could be processed through a series of screens for multiple colors. If a transparent or slightly translucent substrate is utilized, a design on the lower surface could show through the pad.

If the mat or pad is to contain suitable advertising, such as a multicolor logo, or a design, such as a picture, school emblem or logo, or other pictures or scenes, etc., one side of the substrate will receive color printing or coating in a reverse printing process with appropriate materials. Thus, in FIG. 6 is shown a six station lithographic press 31 for multicolor printing and coating of the U.V. ink and tackiness agent on the lower surface; the substrate being transparent with the printing occurring from the backside and showing through the substrate. The press 31 includes a sheet feeding initial station 32 where individual sheets for a single mat or pad or for multiple mats or pads on a single sheet. A feeding device 33 feeds sheets in sequence through several color printing stations 34, 37, 41, 44, 47 and 51; each station containing suitable rollers 35, 36; 38, 39; 42, 43; 45, 46; 48, 49; and 52, 53 for applying each of the six inks, respectively.

Also, intermediate rollers 54, 55, 56, 57, 58, and 59 are located between the rollers 35, 38, 42, 45, 48 and 52 for driving and synchronizing the rollers together. Beyond the last ink color station 51 is positioned a first coating unit 61 for coating the undersurface of the sheet by rollers 62, 63, applying the U.V. ink with tackiness compound therein, a drying unit 64 and a second coating unit 65 with rollers 66, 67 followed by a chain or belt drying unit 69 leading to a delivery station 71.

The process for coating a mat or pad is especially useful for mouse pads used with a computer. Today, substantially all computers rely heavily upon the use of a mouse for easily and quickly controlling the functions of the computer with respect to selecting programs, and features and functions, such as a spelling checker, printing, format, underlining, etc. Present day mouse pads are relatively thick with a top surface to allow movement of the mouse thereon and a non-slip undersurface formed of a foam rubber; the top surface being relatively thin and the foam underlayer providing most of the thickness for the pad. The new mouse pad of the present invention reduces the thickness of the pad to approximately one-third or one-fourth of the total thickness of the presently used pads and provides a "Velvet" texture finish or matte finish.

In businesses, such as restaurants, diners, lunchrooms, and the like, a change pad or counter mat is used over a generally glass top of a case, which may contain candy, cigars, cigarettes, etc., where the mat has a foam rubber or similar backing giving the mat a substantial thickness and providing the non-slip characteristic of the mat on a glass or other smooth top. Unfortunately, the foam rubber backing will absorb odors and liquids from spillage, may become sticky and, when dry, stick to the counter top. If the mat remains stuck to the counter top for a any substantial time, it will require extra labor to remove the mat by scraping or otherwise removing the mat by a suitable solvent. The mat manufactured using the new materials and characteristics, will not absorb liquids or odors, and is easily cleanable. Also, the coating of the non-slip material on the undersurface of the mat may be colored and/or may be provided with a suitable texture to the ink coated surface which will further enhance the non-slip characteristics of the mat or pad.

In the home, drink coasters may be provided by the host to provide heat protection and/or cold temperature protection to prevent surface damage to a desk or table top from heat or from liquid spots from condensation on a furniture surface from a cold glass or from spillage of the contents of the glass. These coasters generally have a cork base surface to provide the non-slip characteristics of the coaster. For a suitable cork coaster, there must be a sufficient thickness of the cork or the surface will crumble in use. Coasters are also formed of metal, hard plastic and leather, however, each of these materials has disadvantages which will be solved by the use of the present material for the coaster. A coaster of the present invention, like a mat or mouse pad, will be relatively thin, will not absorb odors or liquids from spillage or condensation, and the tacky compound in the lower surface provides an ideal non-slip surface on a table or desk top without marring the surface and provides excellent protection from spotting, spillage or other accidents.

Although the use of the non-slip pad or mat has been described for use with a computer mouse pad, a counter mat for a restaurant or convenience store or as a coaster for use with hot or cold drinks wherein the coaster acts to protect a wooden or other surface from heat or cold which is subject to marring or staining from high temperature or spillage, the present invention may be utilized with any pad or mat where a non-slip characteristic is required in the home, industry or retail establishment.

I claim:

1. A method for manufacturing a non-slip mat or pad, including the steps of providing a mat or pad formed of a plastic material, printing a design or logo to show on the upper surface of the mat, and applying a non-slip surface to the underside of the mat or pad with the total thickness of the mat or pad in the range of 1.0 to 30.0 mils.

2. A method as set forth in claim 1, in which said non-slip surface is formed by coating the underside of the mat or pad with a ink containing a tackiness agent.

3. A method as set forth in claim 2, in which said ink is an ultraviolet ink adapted to be cured by ultraviolet light.

4. A method as set forth in claim 2, in which said ink is a water-based ink.

5. A method as set forth in claim 2, in which said ink is a solvent-based ink.

6. A method as set forth in claim 2, wherein said ink is applied by coating the underside of said mat or pad through a silk screening operation.

7. A method as set forth in claim 2, in which said ink is applied by a coating roller in a sheet-feed lithographic press.

8. A method as set forth in claim 2, in which said pad or mat is formed as a continuous sheet with the coating applied by coating rollers in a web-feed lithographic press.

9. A method as set forth in claim 1, in which said pad or mat is formed as a continuous sheet and said non-slip material is formed as a continuous film, and said sheet and film are fed together into a web feed press and compressed together to form the pads or mats, and said individual pads or mats are cut apart by a stamping operation.

* * * * *